Nov. 2, 1948.

J. B. KOETT 2,453,020

LATHE GRINDING DEVICE

Filed March 4, 1946

Inventor
J. B. KOETT

By Kimmel & Crowell
Attorneys

Nov. 2, 1948.  J. B. KOETT  2,453,020
LATHE GRINDING DEVICE
Filed March 4, 1946  4 Sheets-Sheet 2

Inventor
J. B. KOETT
By Kimmel & Crowell
Attorneys

Nov. 2, 1948.   J. B. KOETT   2,453,020
LATHE GRINDING DEVICE
Filed March 4, 1946   4 Sheets-Sheet 3

Inventor
J. B. KOETT
By Kimmel & Crowell
Attorneys

Nov. 2, 1948.                J. B. KOETT                2,453,020
                          LATHE GRINDING DEVICE
Filed March 4, 1946                              4 Sheets-Sheet 4
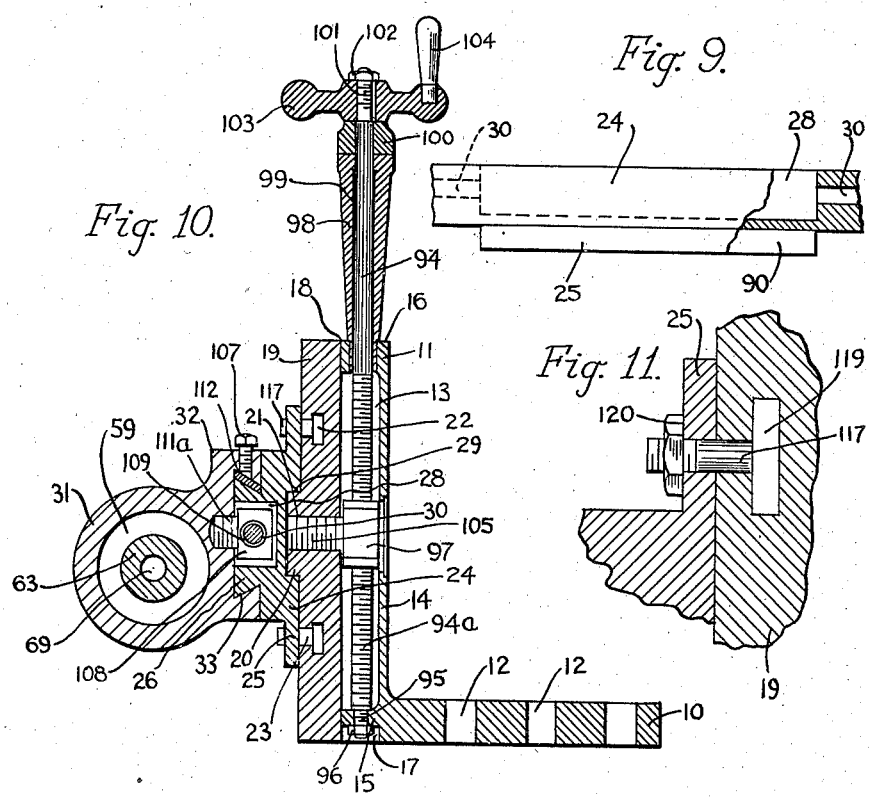
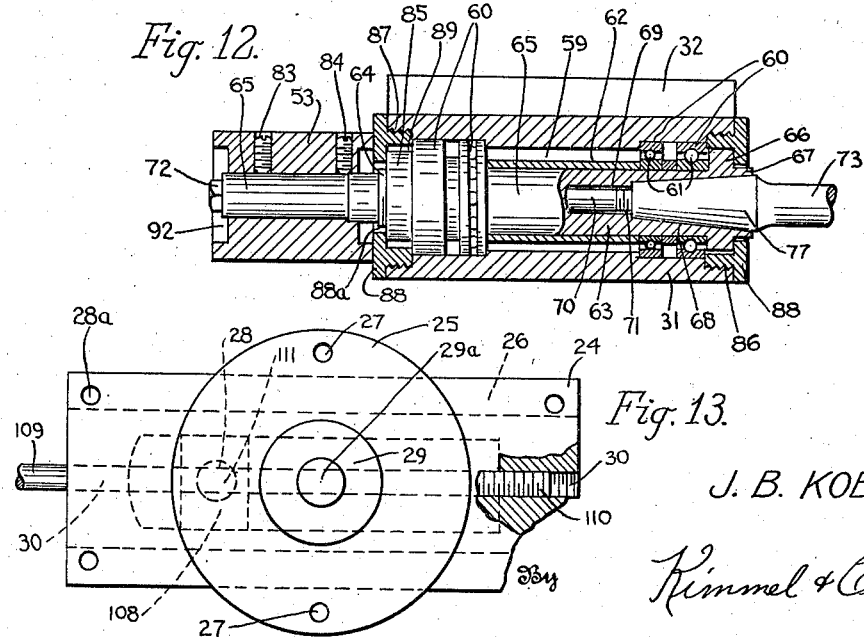
Inventor
J. B. KOETT
By Kimmel & Crowell
Attorneys Patented Nov. 2, 1948

2,453,020

UNITED STATES PATENT OFFICE 2,453,020

LATHE GRINDING DEVICE

Joseph B. Koett, Oneonta, N. Y., assignor, by mesne assignments, to Koett Universal, Inc., Oneonta, N. Y., a corporation of New York Application March 4, 1946, Serial No. 651,724

1 Claim. (Cl. 51—259)

This invention relates to improvements in machinery and more particularly to a universal lathe grinder device and the like.

One of the objects of this invention is to provide a simple, efficient and inexpensive device of the character described which will be equally well adapted to perform a variety of different jobs in a machine shop from various angularly adjusted positions with respect to the bed of the machine to which it is applied.

Another object thereof is to provide a machine attachment particularly designed for grinding, milling, drilling, boring and dovetailing operations upon a lathe or similar machine, whether it be a toolpost of a turret lathe or an engine lathe, as the case may be.

A further object thereof is to provide an interchangeably efficient, sturdy, dependable, and economical machine attachment readily and removably attachable to a lathe, milling machine, shaper, planer, as well as to a surface grinder for external and internal grinding.

Another object thereof is to so mount the present invention upon a given machine, as an attachment thereof, that it may be shifted thereon manually in any position so it can be caused to function for a turned over or end up position, as well as in normal position.

A further object thereof is to provide a machine attachment and tool holder capable of traveling with its grinding head in either a vertical or horizontal position or direction, or of being tilted from a center position upon the machine upon which it is mounted.

A special object thereof is to provide a machine of the kind described such that when used on a lathe, it can be mounted on the toolpost thereof and be adjusted longitudinally and vertically, and when so adjusted is adapted to be employed as a grinder, a key-slotter, buffer, miller or for drilling, boring, reaming, lapping and honing interchangeably. Being capable also of swiveling at various degrees on the compound of any lathe it is readily adapted to be used for flat grinding, or for milling key-ways and slotting, recessing, routing and back-off.

Another special object thereof is to provide a machine of the kind described such that, when used on a miller, can be made to grind cutting tools, back-off cutting tools, and to mill, drill, hone, bore, rout and index various machined parts, and when used in the miller can be used also as a horizontal miller and grinder on the over arm of a milling machine.

Another object thereof is to provide a machine of the kind described such that, when used on a surface grinder it can be readily employed as an internal and external grinder, and by virtue of means provided therefor will also give accurate and precise readings for any grinding or honing job. By tilting the machine it is further possible to adapt it to grind the angle on tapered or other surfaces and also to grind large radii of machined parts.

A final object thereof is to provide a machine of the kind described such that, when used on a drill press it can be made serviceable in automobile repair work for grinding valves, slotting screws, key-ways and grooves, internal or external, and for honing piston walls, honing brake cylinders and other similar operations.

With the above and other objects in view, my invention consists in the combination, arrangement and details of construction disclosed in the drawings and specification, and then more particularly pointed out in the appended claim.

In the drawings, wherein similar reference characters designate similar parts throughout the several views, Figure 1 is a top plan view of my invention, Figure 2 is an end elevation thereof, Figure 3 is a view similar to Figure 2 but showing parts in a qualified position, Figure 4 is a longitudinal sectional view of a tool, Figure 5 is a view taken at right angles to Figure 1, Figure 6 is a side elevation thereof, Figure 7 is another and opposite side elevation thereof, Figure 8 is a fragmental detail view of the graduated dovetail slide, Figure 9 is a longitudinal view of the parts of Figure 8, partly in section, Figure 10 is a sectional elevation of my invention, Figure 11 is a fragmental sectional detail view of the mounting for a tool holder.

Figure 12 is a longitudinal sectional view of the tool holder, and

Figure 13 is a front elevation of the graduated dovetail slide partly in section.

Figure 1:
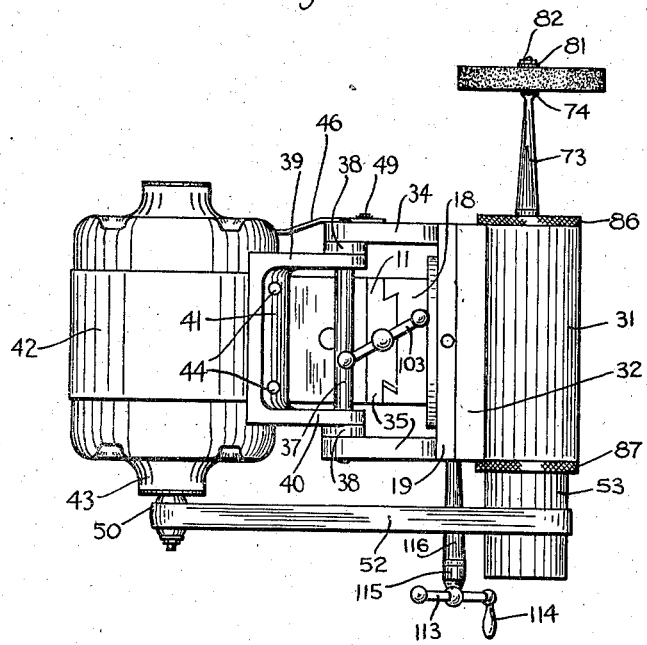
Figure 2:
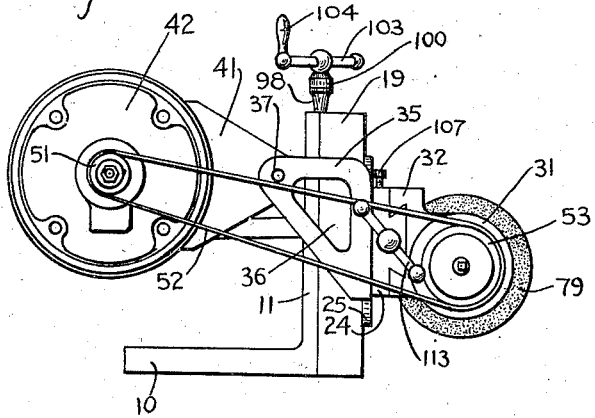

Referring to the drawings which are merely illustrative of my invention, I detail the various parts thereof. A sturdily constructed machine attachment takes the form of a bracket or base angle plate 10, the upstanding portion of which is designated 11. The plate 10 is formed with a plurality of holes 12 by means of which the bracket can be removably attached to the particular type of machine desired. A carriage is mounted upon the bracket, designated 14, having bearing ends 15 and 16 respectively and being formed between same with a longitudinal chamber 17, dovetailed out for the reception of the dovetail portion 18 of a dovetail slide 19.

There is a dial plate 25, which is a part of the slide 24 and this dial plate overlies the dovetail slide or carriage 19. The slide 19 is formed with an annular track or groove 22 which opens out of the face of slide 19 by means of an annular concentric counterrace 23, this track being also formed concentrically of a cylindrical collar 29 with which slide 19 is provided as a means for centering the cylindrical socket or counterseat 29 formed in the dial plate 25 of slide 14. The latter is formed with a dovetail part 26, holes 28a flanking the same. Diametrically opposite holes 27 are also formed upon the dial plate 25 as shown in Figure 13. Extending longitudinally centrally in the slide 24 is a bore 30 which is screw threaded at one end as shown in Figure 13.

A bearing housing or tool holder 31 is provided which is formed upon a block 32 formed with a dovetail recess 33. The dovetailed part 26 of slide 24 is chambered out as at 28. For the purpose of supporting an electric motor 42 oppositely arranged brackets 34 and 35 are provided, which straddle the carriage 19 at opposite ends. Each bracket has a triangular slot 36. The ends of a stout rod or pintle 37 pass into the upper corners of the brackets 34, 35 and connect them together in front of the bracket 10 suitable washers 38 being mounted upon this rod which also abut the brackets, and abuttingly engaging these washers are the inner ends of arms 39 and 40 of a lever yoke 41 which are fulcrumed upon rod 37. The electric motor 42 is rigidly secured with a convex surface thereof accommodated in the arcuate surface 45 of the yoke 41, fasteners 44 securing the motor to this yoke. The motor carries bearings 43 at opposite ends thereof. As a means of holding the motor elevated with respect to the bracket 10 and slide 19, I employ a brace arm 46 of rigid construction shown in Figures 1 and 3. This brace arm is attachable at varying points in the circumference of the motor 42, by passing a screw 47 through its other end and also in any one of the series of ears 47a formed on the motor which has holes 47b in them to accommodate said screw. The other end of the brace arm is slotted, as at 48, so a locking screw 49 may pass therethrough and be tapped removably into the adjacent bracket 34.

Figure 7:
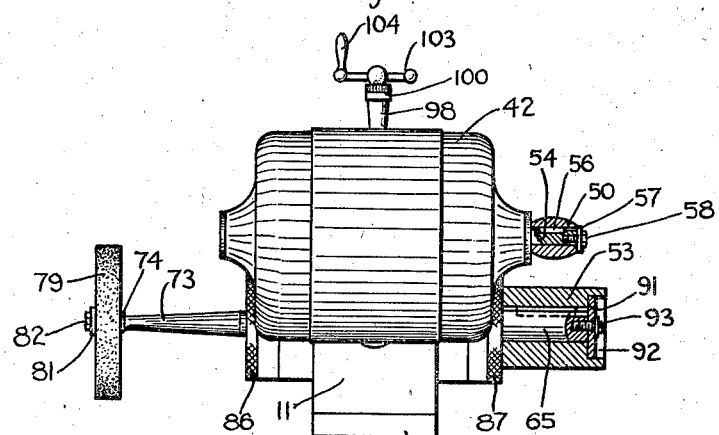
Figure 8:
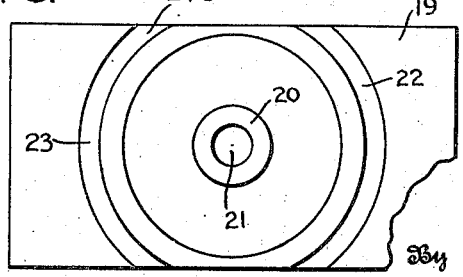

Mounted upon the motor shaft 54 is a pulley 51 which, as shown in Figure 7, is of convex exterior surface preferably. This pulley is splined as at 56 into the motor shaft 54, and held against endwise displacement from the shaft by means of a washer 57 held in place around the shaft by a screw 58. There is a mandrel pulley 53 attached to the end of a quill 63 about to be described. This is an elongated pulley which is removably attached to the end 65 of the quill by screws 83, and is formed at its outer end also with a cylindrical socket 92. A belt is trained upon pulleys 53 and 51, designated 52.

Figure 4:
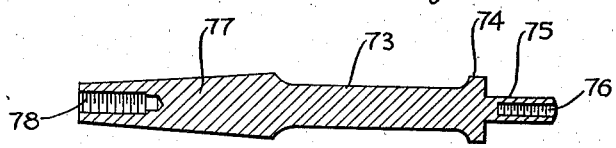
Figure 5:
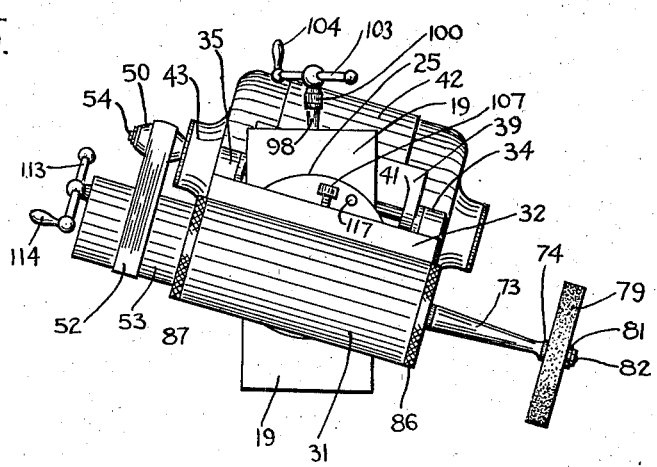
Figure 6:
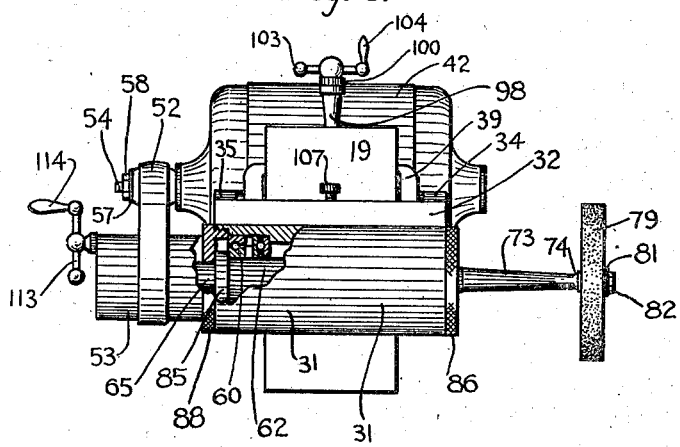

The tool holder 31 has a hollow interior 59 and at the opposite ends of the latter are fitted ball bearings 60 in which are anti-friction balls 61. An elongated sleeve 62 is mounted at opposite ends in the ball bearings in which is snugly received and held the quill 63 as a means of centering and rotating any of a number of interchangeable tools. The rear end of the quill is threaded as at 64, and there is a reduced stem 65 projecting beyond its threaded portion upon which the elongated pulley 53 is secured. At its opposite end the quill is formed with a flange 66 in advance of which is a terminal socket portion 67. A conical socket 68 is formed so as to open out of the internal bore 69 of the quill, so as to flare outwardly of its tool receiving end. There is a draw bar or tie rod 70 which extends longitudinally in the bore 69 of the quill. It is formed at one end with a threaded portion 71 and at its other remote end with an integral head 72. It is employed for certain types of tools which it is desired to mount in the tool holder 31. One such tool is illustrated in Figure 4. Here there is disclosed a spindle 73 formed short of one end thereof with an annular shoulder or flange 74 from which projects as one terminal of the tool a reduced pintle 75 which is internally formed with a screw threaded socket 76. At the opposite end of this tool is a conical shank 77 which tapers towards the adjacent end, which end is formed with an internal screw threaded passage 78. A grinder disk is designated 79. It is mounted upon the pintle 75 of the tool in question so as to abut with one side against the flange 74 of the spindle, after which a washer 80 is slipped onto the pintle so as to abut the other side of the grinding disk, and then a screw 82 is taken and screwed home into the screw threaded passage or socket 76 of the spindle to hold the disk against endwise displacement from the spindle.

The elongated pulley 53 is formed with screw holes 83 in which machine screws 84 are tapped so as to bind this pulley fast upon the reduced stem 65 of the quill. Sleeve 62 is formed with a flange 85 which extends snugly into an annular chamber 89 formed in a dust cap 86, there being two dust caps, one at each end of the tool holder 31, the other dust cap being designated 87. Chamber 89 is formed in the flange or collar 88 of the dust cap. Each dust cap has its screw threaded collar 88 threaded into one end of the tool holder 31, and through a central opening therein, 88a, projects the stem 65 of the quill.

A washer 91 is employed to fit into the chamber 92, Fig. 7, of the pulley 53, and a screw 93 is tapped into the washer and into the adjacent end of the quill. It will be seen from Figure 12 that the flange 66 of the quill is of a diameter larger than the sleeve 62, so the sleeve abuts at one end against this flange which arrangement holds this end of the quill in centered position in the tool holder, while the flange 85 of the sleeve bearing against the dust cap 87 receives endwise thrust of the flange of the quill upon this sleeve, while the same quill flange is rotatively received in the chamber 92 of the other dust cap 86.

The bracket part 11, which is upstanding or upright receives in its hollowed-out portion 13a, screw rod 94, the screw threads of which are designated 94a. This screw rod has a reduced portion or terminal 95 which is screw threaded as shown in Figure 10, so that a nut 96 may clamp this terminal in abutting relation to one of the bearings 15, at each end of the hollowed-out portion 13. A nut 97 is screwed onto the screw rod 94 and is designed to travel in the chamber 13 longitudinally thereof. The screw rod 94 slidably projects out of the dovetailed portion 18 of the bracket and is encased in a tubular spacer member 98, conical in cross section which has its inner tapering end operatively positioned into this dovetailed portion. A collar dial 100 also encircles rod 94 and abuts the adjacent end of the spacer member 98. The rod 94 terminates in a reduced threaded terminal 101 around which is mounted for rotation a hand wheel 103 having the operating crank handle 104. A nut 102 is threaded upon the terminal 101 and it clamps the hand wheel in position and against displacement from the spacer member 98. Threadably engaging the disk 97 in a plane at right angles to the axis of the screw rod 94 is a screw 105 which projects and is threaded into the bore 21 in the cylindrical collar 20 of the dovetail slide 19, as shown in Figure 10. This screw is threaded into the screw threaded bore 111 of the nut as shown in Figure 13.

There is another nut 108 which is screw threaded upon a screw rod 109 which extends longitudinally into the bores 30 formed in the ends of the graduated dovetail slide 24 as shown in Figure 13, such that the inner end of this screw rod 110 is rotatably mounted in the adjacent bore 30 to hold rod 109 against endwise movement. A screw 111a is threaded into nut 108 and also into block 32 of the tool holder 31, as shown in Figure 10. There is a gib or wear plate 112 located in the dovetail groove in which the dovetail part 26 of the dovetail slide 24 works, and it is pressed adjustably against the dovetail part 26 by the adjusting screw 107. Operatively secured into the dovetail slide 24 is the tapered end of a conical spacer washer 116, against whose outer end abuts a washer or dial collar 115, against the outer edge of which bears the hand wheel 113 which has the operating crank handle 114, a nut similar to that shown at 102 in Figure 10 holding this hand wheel in position upon the screw rod 109. As a means of attaching the dial plate 25 of the dovetail slide 24 swivellably of the carriage 19 T-shaped bolts 117 may be made use of as shown in Figure 11. Here there is shown the manner of attachment. The T-bolts have their threaded shanks projecting through the holes 27 of the dial plate 25 (Figure 13). The heads 119 of these bolts are introduced into the open ends 24b (Figure 9) of the annular track 22 formed in carriage 19. With the shanks of the bolts accommodated in the counter-race 23 thereof. The clamping nuts 120 may then be tightened against the dial plate 25 which they abut to lock the dovetail 24 in position with respect to the carriage 19.

The operation of my invention is as follows. According to the nature of the machine shop work it is proposed to do, the proper tool will be placed in the tool holder 31 and centered therein for rotation. If the tool shown in Figure 4 is employed to mount a grinder wheel or disk 79 upon the tool holder, the procedure is as follows: In Figure 12 it is seen that the tapering shank 77 of the spindle 73 has a screw threaded bore 78 into which the screw threaded end 71 of the tie rod 70 is threaded tightly so as to seat the tapered shank 77 snugly into the conically tapered socket 68 of the quill, the screwing home of the tie bolt causing its head 72 to be clamped abuttingly against the adjacent end of the quill 63. This rigidly centers the spindle in the tool holder. The grinder wheel is then clamped between flange 74 of the quill and washer 81 on its terminal pintle 75 by the screw 82. This mounts the grinder wheel firmly in position upon the outer end of the spindle.

It will be seen that all the parts of the present device are self contained and that the grinder wheel is spaced a convenient distance apart therefrom so encounters no obstructions to free rotation against the part it engages for a grinding or planing operation. The electrical motor is started and by means of its belt drive from pulley 50 on the motor to pulley 53 on the quill motion is transmitted to the spindle 73 by the rotating quill. The part 10 of the bracket will be removably attached to whatever machine it is desired in accordance with the kind of job it is intended to work at, attaching bolts passing through the holes 12 thereof.

Figure 3:
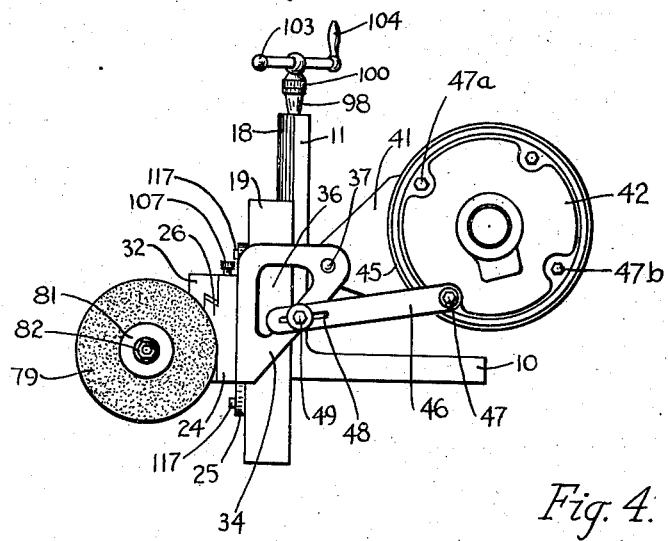

Whatever the tool mounted upon the tool holder 31, it may be caused to perform its work in various angular and radial positions with respect to the fixedly attached bracket. The operator takes hold of the crank handle 104 and turns the hand wheel 103 for the purpose of rotating screw rod 94, to make the die 97 move vertically in the bracket and through the screw 105, when the die begins to travel it carries the carriage slide 19 along with it, as shown in Figure 3, and as the motor and tool holder is mounted upon this carriage they move in unison with the carriage slide 19 up or down of the bracket, up after being down. If it is desired to move the tool holder horizontally of the attaching bracket, the operator takes hold of the crank handle 114 and turns the hand wheel 113, to rotate screw rod 109, and thus cause die 108 to travel horizontally upon this screw rod, and by its screw connection at 11a to the tool holder it will cause the tool holder to move along with the die. As the tool holder and its dovetail part move over the dovetail tenon 26 of the slide 24, the pulley 53 on the quill of the tool holder slides adjustably with respect to the belt 52 trained upon it and upon the pulley 50 on the motor shaft 54. The electric motor is thus fixed in position and will not move horizontally with the tool holder. The convex surface on motor shaft pulley 50 sets up ample frictional interengagement between belt 52 and pulley 50 to hold the belt engaged with pulley 50 while the pulley 53 slides frictionally with respect to the belt.

Should it be desired to move the tool holder radially and not rectilinearly, the operator loosens the nuts 120 as shown in Figure 11, which allows the heads of the bolts 117 to slide circumferentially in the annular track 22 of the carriage slide 19, as the slide 24 is swivelled with respect to the carriage. By locking the nut 120 again, the slide 24 may be rigidly held in radially adjusted position. It is thus seen that the tool holder can be placed in such positions where the working end of the tool may best serve the purpose of doing special machine work. The tool does not have to be removed from its original position as this is effected. At all times the operator and machinist is able to consult the dial collars 100 or 115 as he turns the proper hand wheel for advancing the carriage vertically or the tool holder horizontally, and he can read the dial indications 90 on the dial plate 25 as he swivels the same about the carriage. I do not mean to confine myself to the exact details of construction save as pointed out in the appended claim.

What I desire to claim and secure by Letters Patent is:

A grinder for attachment to a lathe comprising an L-shaped member having one side thereof horizontal and the other side thereof vertical, a vertical guide carried by one face of said vertical side, a carriage engaging said guide, means for vertically adjusting said carriage relative to said guide, said carriage having a circular channel in the outer face thereof formed T-shaped in transverse section, a second guide, means engaging in said channel securing said second guide to said carriage, whereby said second guide may be angularly adjusted about a horizontal axis, a second carriage engaging said second guide, means adjusting said second carriage lengthwise of said second guide, a mandrel journalled in said second carriage, a pulley secured to one end of said mandrel, a pair of brackets fixed to said second guide and projecting rearwardly of the latter, a motor pivotally secured between said brackets, a holding link secured between said second guide and said motor, and endless driving means between said motor and pulley, said pulley having substantial width whereby said second carriage may be lengthwise adjusted without breaking the driving connection between said motor and said pulley.

JOSEPH B. KOETT.

REFERENCES CITED

The following references are of record in the file of this patent:

UNITED STATES PATENTS

| Number | Name | Date |
|---|---|---|
| 1,598,667 | Waite | Sept. 7, 1926 |
| 1,962,489 | Elbert | June 12, 1934 |
| 2,277,417 | Scrivener | Mar. 24, 1942 |
| 2,362,873 | Nessman | Nov. 14, 1944 |

FOREIGN PATENTS

| Number | Country | Date |
|---|---|---|
| 341,868 | Great Britain | Jan. 21, 1931 |
| 505,663 | France | May 12, 1920 |